No. 731,310.

Patented June 16, 1903.

UNITED STATES PATENT OFFICE.

HERMANN L. KUBBERNUSS, OF ST. LOUIS, MISSOURI.

COMPOSITION OF MATTER.

SPECIFICATION forming part of Letters Patent No. 731,310, dated June 16, 1903.

Application filed April 13, 1903. Serial No. 152,389. (No specimens.)

*To all whom it may concern:*

Be it known that I, HERMANN L. KUBBERNUSS, a subject of the Emperor of Germany, residing at the city of St. Louis, State of Missouri, have invented certain new and useful Improvements in Composition of Matter, of which the following is a specification.

This invention relates to compositions of matter for fireproofing purposes. The composition may be applied to the parts which it is desired to render fireproof in the form of a plastic mass or cement. It is desirable also that the material should be of such consistency that when nails are driven into it it shall not be so brittle as readily to fracture, and also that the character of the material shall be such that the acoustic properties of the room in which it is used shall not suffer deterioration thereby. It may be used in any position where it is desired to effect a fireproof result.

My improved composition of matter for the above-mentioned uses and purposes consists of the following component parts or ingredients in the proportions named: thirty per cent. sulfate of lime, ten per cent. powdered cork-meal, three per cent. alum, five per cent. animal glue, seven per cent. coal-cinders, five per cent. boiled animal hair, twenty per cent. slaked lime and twenty per cent. sand.

The technical chemical effect of the above-mentioned ingredients is as follows: The cork-meal is introduced for insulating purposes. The coal-cinders are porous and absorb the liquid elements, so as to tend to hold the mass when solidified together and with the sand give body to the whole. The boiled animal hair also tends to bind the different portions of the mass together and to strengthen the whole when solidified. The slaked lime causes the composition to set. The mixture of alum with animal glue renders the finished product impervious to water, and the combination of sulfate of lime with the other elements yields a hardened cement-like effect, which when the above-mentioned ingredients have all been united secures the above-mentioned desirable objects in a most satisfactory manner.

It is obvious that I do not intend to limit myself to coal-cinders or to animal hair, as substitutes therefor having the same properties can be readily found.

Having thus described my said invention, what I claim, and desire to secure by Letters Patent, is—

1. A composition comprising a mixture of sulfate of lime; powdered cork-meal; alum mixed with animal glue; coal-cinders; boiled animal hair; slaked lime; and sand.

2. A composition comprising a mixture of sulfate of lime; cork-meal; alum; glue; fragmentary porous material; hair; slaked lime; and sand.

3. A composition comprising a mixture of thirty parts sulfate of lime, ten parts powdered cork-meal, three parts alum, five parts animal glue, seven parts coal-cinders, five parts boiled animal hair, twenty parts slaked lime, twenty parts sand, substantially as described.

In testimony whereof I have affixed my signature, in presence of two witnesses, this 30th day of March, 1903.

HERMANN L. KUBBERNUSS.

Witnesses:
HAUN L. MOLIBIN,
MAUD E. LETCHER.